(12) United States Patent
Bolshtyansky et al.

(10) Patent No.: US 7,969,647 B2
(45) Date of Patent: Jun. 28, 2011

(54) APPARATUS AND METHOD FOR FLATTENING GAIN PROFILE OF AN OPTICAL AMPLIFIER

(75) Inventors: Maxim Bolshtyansky, East Windsor, NJ (US); Gregory Cowle, Red Bank, NJ (US)

(73) Assignee: JDS Uniphase Corporation, Milpitas, CA (US)

( * ) Notice: Subject to any disclaimer, the term of this patent is extended or adjusted under 35 U.S.C. 154(b) by 290 days.

(21) Appl. No.: 12/235,041

(22) Filed: Sep. 22, 2008

(65) Prior Publication Data

US 2009/0091819 A1 Apr. 9, 2009

Related U.S. Application Data

(60) Provisional application No. 60/978,253, filed on Oct. 8, 2007.

(51) Int. Cl.
*H04B 10/17* (2006.01)
*H01S 3/30* (2006.01)
*H04B 10/12* (2006.01)

(52) U.S. Cl. ............. 359/334; 359/337.11; 359/341.4

(58) Field of Classification Search ............. 359/337.11, 359/341.4, 334
See application file for complete search history.

(56) References Cited

U.S. PATENT DOCUMENTS

| | | | |
|---|---|---|---|
| 5,838,487 A * | 11/1998 | Nilsson et al. | 359/337.12 |
| 6,088,152 A | 7/2000 | Berger et al. | 359/334 |
| 6,275,313 B1 | 8/2001 | Denkin et al. | 398/9 |
| 6,341,034 B1 * | 1/2002 | Sun et al. | 359/341.41 |
| 6,377,730 B1 * | 4/2002 | Bergmann et al. | 385/39 |
| 6,441,950 B1 * | 8/2002 | Chen et al. | 359/334 |
| 6,510,000 B1 * | 1/2003 | Onaka et al. | 359/334 |
| 6,721,091 B2 * | 4/2004 | Foursa et al. | 359/341.43 |
| 6,775,056 B2 * | 8/2004 | Grubb et al. | 359/337.4 |
| 7,236,294 B2 | 6/2007 | Takeyama et al. | 359/337 |
| 7,359,112 B2 | 4/2008 | Nishihara et al. | 359/341.41 |
| 2002/0044343 A1 * | 4/2002 | Manzur | 359/337.11 |
| 2006/0187538 A1 * | 8/2006 | Zhou et al. | 359/341.1 |
| 2006/0187539 A1 * | 8/2006 | Zhou et al. | 359/341.4 |
| 2006/0203329 A1 * | 9/2006 | Nishihara et al. | 359/337 |

OTHER PUBLICATIONS

Xiang Zhou et al, "Fast control of inter-channel SRS and residual EDFA transients using a multiple-wavelength forward-pumped discrete Raman amplifier," OMN4, OFC 2007.
Maxim Bolshtyansky et al, "Dynamic Compensation of Raman Tilt in a Fiber Link by EDFA during Transient Events," JThA15, OFC 2007.

* cited by examiner

*Primary Examiner* — Eric Bolda
(74) *Attorney, Agent, or Firm* — Matthew A. Pequignot; Pequignot + Myers LLC

(57) ABSTRACT

A change in loading conditions of fiber amplifiers in an optical communications network causes rapid variations in the gain profile of the amplifiers due to spectral hole burning and stimulated Raman scattering. An apparatus for reducing such gain profile variations is described which monitors optical signal perturbations and reacts by adjusting pump powers of the amplifiers and, or fast variable optical attenuator according to a pre-determined function stored in the form of constants in controller's memory. The optical signal is monitored as total power, and the power of light after passing through one or more optical filters. The light detection is relatively fast, whereby the gain profile variations are compensated by fast controlled variable optical attenuator and pump power adjustment upon the change in loading conditions.

18 Claims, 9 Drawing Sheets

APPARATUS AND METHOD FOR FLATTENING GAIN PROFILE OF AN OPTICAL AMPLIFIER

CROSS-REFERENCE TO RELATED APPLICATIONS

The present invention claims priority from U.S. provisional patent application No. 60/978,253, filed Oct. 8, 2007, which is incorporated herein by reference.

TECHNICAL FIELD

The present invention is related to optical fiber amplifiers, and in particular to flattening the gain profile of erbium doped fiber amplifiers (EDFA), Raman Amplifiers (RA), and hybrid EDFA-RA amplifiers.

BACKGROUND OF THE INVENTION

In a wavelength division multiplexing optical transmission system, various information channels are encoded into light at different wavelengths, which is combined using a multiplexor. The combined light is transmitted through an optical fiber and, or an optical fiber network to a receiver end of the optical fiber. At the receiver end, the signal is separated, or demultiplexed, back into the individual optical channels through a de-multiplexor, whereby each optical channel can be detected by an optical detector such as a photodiode, and the information can be reconstructed, channel by channel.

While propagating through the optical fiber, light tends to lose power due to the losses related to the physics of how the light interacts with the optical fiber. Yet some minimal level of optical channel power is required at the receiver end in order to decode information encoded in the optical channel. In order to boost the optical signal propagating in the optical fiber, optical amplifiers are deployed at multiple locations, known as nodes, along the transmission link. The optical amplifiers extend the maximum possible length of the link, in some instances, from a few hundred kilometers to several thousand kilometers, whereby after each fiber span, the optical signal is amplified to power levels close to the original levels of the transmitter. Unfortunately, during the amplification process some amount of noise is introduced into the optical signal which effectively limits the amount of optical amplifiers a transmission link can have.

Modern optical communication systems employ erbium doped fiber amplifiers (EDFAs), Raman Amplifiers (RAs) and hybrid EDFA-RAs as means to boost the optical signal power and thus to extend the communication system reach. Nowadays, optical communication systems have become more agile and reconfigurable. Reconfiguration of the optical communication system leads to variation of the signal load at the input of the amplifier. At the same time, the goal of the amplifier is to provide constant gain, which should not depend on the power or wavelength loading condition; otherwise, some channels will not have sufficient power and signal-to-noise level at the receiver end, resulting in information being lost.

The control electronics of EDFAs partially solves the problem of the variable signal load. More particularly, the total optical power at the input and at the output of the amplifier is measured, and the average optical signal gain of the amplifier is calculated. The amplifier control electronic circuitry adjusts the amplifier's pump powers through a feedback loop in such a way that the measured optical gain equals to the desired or "set" optical gain and is not varied significantly in time.

However, it is desired not only to have average gain of the amplifier to be constant, but also to have the gain of the individual channel constant and independent from the other channels' presence or absence, that is, independent from the channel load. At the same time, due to the spectroscopy of the erbium doped fiber, namely due to the spectral hole burning (SHB) effect, the gain shape of EDFA does depend on the input load. Hence even if the average gain of an EDFA is held constant, the gain of the individual channels will vary, leading to undesirable effects, such as increased bit error rate of the transmission system.

One way in which to address the problem is to check the channel powers at a location in the transmission system, using an optical channel monitor (OCM). The collected information is then used by the system control circuitry to adjust a dynamic gain equalizer (DGE) in the transmission link in such a way that the transmitted spectrum is flattened. The OCM and DGE need not necessarily be at a same location in the system. The advantage of this approach that it compensates for all gain change inducing impairments of the system, such as stimulated Raman scattering (SRS) induced tilt, not only EDFA SHB.

However the above approach has several disadvantages. First, because the DGE and OCM are expensive components, they are not generally installed at each amplifier node, thus they compensate several amplifiers at once, which is not optimal. Second, both OCM and DGE are comparatively slow devices, and thus the correction usually takes a few seconds. This is undesirable for agile communication systems where a typical requirement for the adjustment for a transient event such as a change of the channel load is on the order of 100 µs, which is 10,000 times shorter than for a DGE/OCM approach.

To address the disadvantage of this compensating technique it has been suggested by Zhou et al. in an article entitled "Fast control of inter-channel SRS and residual EDFA transients using a multiple-wavelength forward-pumped discrete Raman amplifier", OMN4, OFC 2007, which is incorporated herein by reference, to measure channel powers of a limited number of channels that are located at specific wavelengths, 1528.6 nm, 1544.4 nm, and 1559.6 nm in the published example. Subsequently, the Raman pump powers of the Raman amplifier are adjusted using linear feed-forward control. The work is based on RAs having 3 different wavelengths of Raman pumps. Again, similar to the aforementioned DGE/OCM approach, this compensates not only EDFA SHB, but SRS tilt as well.

The main disadvantage of this technique is the requirement of the constant presence of those three channels the power of which is constantly monitored. This is a very limiting requirement for modern agile communication systems. Another potential disadvantage is the requirement to have three additional detectors. Finally, relatively good SHB compensation is possible only in the presence of three Raman pumps—the reduction of number of pumps will lead to the reduction of the amount of compensation.

Further, in U.S. Pat. No. 7,359,112 by Nishihara et al. which is incorporated herein by reference, a control apparatus is described which adjusts the gain of an EDFA based on an amount of wavelengths which is calculated on the basis of optical power measured in two or three separate spectral bands by dedicated photodetectors. One disadvantage of this approach is that only one control parameter, specifically the EDFA gain, is adjusted which limits the degree to which both the SHB and SRS can be compensated. Another disadvantage stems from the fact that certain load change patterns, for example the patterns which leave the total optical power measured in a single spectral band unchanged, will not be detected by the apparatus of Nishihara et al. and therefore will not be compensated for by said apparatus.

It is an object of the present invention to provide an apparatus and method for flattening a gain profile of an optical amplifier suitable for suppression of sub-millisecond scale transient variations of gain caused by changes in the amplifier load which would not require dedicated spectral channels in order to monitor the gain profile. This invention extends the technique that was suggested by Bolshtyansky et al. in an article entitled "Dynamic Compensation of Raman Tilt in a Fiber Link by EDFA during Transient Events", JThA15, OFC 2007, where instead of measuring the actual gain change, the device measures some property of the transmitted signal, and adjusts the gain profile based on the measured property of the signal.

SUMMARY OF THE INVENTION

The apparatus of the present invention branches off a small portion of a transmitted optical signal, splits this portion into a plurality of sub-portions, passes the sub-portions through a set of characteristic optical filters, and measures the resulting optical powers. Based on the measurements, the apparatus adjusts the pump power of an erbium doped fiber amplifier (EDFA) and, or the pump power(s) of a Raman amplifier (RA), and, or the attenuation setting of a fast variable optical attenuator, according to a pre-defined set of response functions chosen to increase the flatness of the gain profile of a hybrid EDFA-RA optical amplifier.

Thus, in accordance with the invention there is provided an apparatus for flattening a gain profile $G(\lambda)$ of a hybrid amplifier comprising an erbium doped fiber amplifier and a Raman amplifier for amplifying a stream of optical signals, the apparatus comprising:

a detection device arranged to receive a tapped portion of the stream of optical signals in the form of N+1 sub-portions and to provide N+1 output signals $P_0 \ldots P_N$ in dependence upon said tapped portion, wherein N is an integer positive number, the detection device comprising: N spectral filters having respective transmission functions $F_1(\lambda) \ldots F_N(\lambda)$; and N+1 photodetectors for producing the N+1 output signals $P_0 \ldots P_N$ in response to a light impinging thereon, wherein the first sub-portion of the tapped portion of the stream of optical signals is coupled to the first photodetector for producing the signal $P_0$, and each one of remaining N of said sub-portions of the tapped portion of the stream of optical signals is coupled to one of the N spectral filters coupled to one of the remaining N photodetectors for producing the signals $P_1 \ldots P_N$;

a controller arranged to receive said signals $P_0 \ldots P_N$ from the detection device and suitably programmed to provide M control signals $x_1 \ldots x_M$ in dependence upon said signals $P_0 \ldots P_N$, wherein M is an integer positive number and $x_m = f_m(C_k, P_0 \ldots P_N)$, wherein $f_m$ is a pre-determined function and $C_k$ are pre-determined constants, for each $m = 1 \ldots M$; and M spectral actuators $S_1 \ldots S_M$ arranged to receive said control signals $x_1 \ldots x_M$, respectively, and modify the gain profile $G(\lambda)$ by a value $\Delta G(\lambda)$ according to the equation $$\Delta G(\lambda) = \sum_{m=1 \ldots M} A_m(\lambda) \cdot x_m,$$

wherein $A_m(\lambda)$ is a fraction of said modification caused by the $m^{th}$ actuator $S_m$ upon receiving a unitary control signal by said actuator;

wherein the functions $f_1 \ldots f_M$ and $F_1 \ldots F_N$ are chosen so as to increase flatness of the gain profile $G(\lambda)$.

In accordance with another aspect of the invention there is further provided a method for flattening a gain profile $G(\lambda)$ of a hybrid amplifier comprising an erbium doped fiber amplifier and a Raman amplifier for amplifying a stream of optical signals, the method comprising:

splitting a tapped portion of the stream of optical signals in the form of N+1 sub-portions;

measuring optical power value $P_0$ of the first said sub-portion;

spectral filtering remaining N sub-portions through N filters having respective transmission functions $F_1(\lambda) \ldots F_N(\lambda)$, and measuring optical power values $P_1 \ldots P_N$ of the respective filtered sub-portions of the tapped portion;

generating M control signals $x_1 \ldots x_M$ based on the formula $x_m = f_m(C_k, P_0 \ldots P_N)$, wherein $f_m$ is a pre-determined function and $C_k$ are pre-determined constants, for each $m = 1 \ldots M$;

applying said M control signals $x_1 \ldots x_M$ to M spectral actuators $S_1 \ldots S_M$, respectively, wherein said actuators modify the gain profile $G(\lambda)$ by a value $$\Delta G(\lambda) = \sum_{m=1 \ldots M} A_m(\lambda) \cdot x_m,$$

wherein $A_m(\lambda)$ is a fraction of said modification caused by the $m^{th}$ actuator $S_m$ upon receiving a unitary control signal by said actuator;

wherein the functions $f_1 \ldots f_M$ and $F_1 \ldots F_N$ are chosen so as to increase the flatness of the gain profile $G(\lambda)$.

BRIEF DESCRIPTION OF THE DRAWINGS

Exemplary embodiments will now be described in conjunction with the drawings in which.

DETAILED DESCRIPTION OF THE INVENTION

While the present teachings are described in conjunction with various embodiments and examples, it is not intended that the present teachings be limited to such embodiments. On the contrary, the present teachings encompass various alternatives, modifications and equivalents, as will be appreciated by those of skill in the art.

Figure 1:
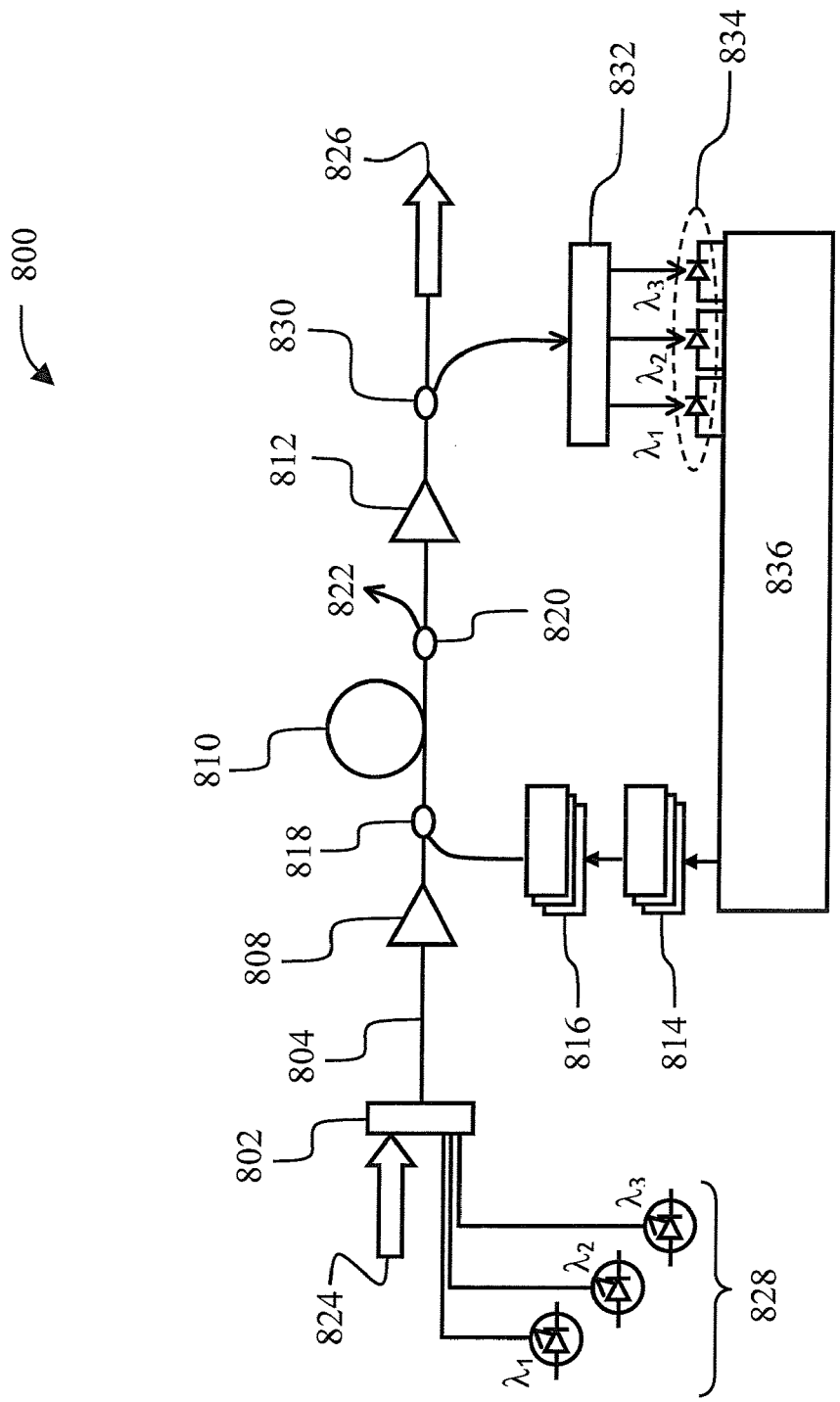
FIG. 1 is a configuration of a prior art apparatus for transient gain deviation control in a hybrid erbium doped fiber amplifier-Raman amplifier optical amplifier.

Referring to FIG. 1, a prior art hybrid optical amplifier 800 is shown comprising a multiplexor 802, a first erbium doped fiber amplifier (EDFA) 808, a span of dispersion compensated optical fiber (DCF) 810, a second EDFA 812, three Raman pump diode lasers 816 emitting pump light at differing pump wavelengths, a Raman pump in-coupler 818 for coupling the Raman pump to DCF 810, and a Raman pump out-coupler 820 for removing a residual Raman pump light 822. An incoming multi-wavelength signal 824, carried by many optical fibers, is multiplexed by multiplexor 802 to propagate in a single optical fiber 804 coupled to amplifier 808. After amplification by EDFAs 808 and 812 and by DCF 810 pumped with diode lasers 816, the signal exits the amplifier as shown by an arrow 826.

In order to correct dynamic gain tilt caused by variations in amount and, or optical power of signals at individual wavelengths comprising incoming multi-wavelength signal 824, a compensation circuit is implemented in the prior art amplifier 800 comprising three signal sources 828 at wavelengths $\lambda_1$, $\lambda_2$, and $\lambda_3$ coupled to multiplexor 802, an output tap 830, a demultiplexor 832 having outputs corresponding to the wavelengths $\lambda_1$, $\lambda_2$, and $\lambda_3$, which are coupled to three separate photodetectors 834, and a controller 836 arranged to receive signals from the photodetectors 834 and adjust drive currents of power supplies 814 supplying the drive currents to three Raman pump diode lasers 816.

In operation, light at three wavelengths $\lambda_1$, $\lambda_2$, and $\lambda_3$ is used to probe the gain profile of amplifier 800 in real time. When a transient change of the amplifier gain appears as a result of a change in the amplifier loading conditions, the ratio of optical power values of light at these three wavelengths changes which prompts the controller 836 to change the ratio of drive currents of Raman pumps accordingly, so as to reduce transient effects and flatten the gain profile of amplifier 800.

Figure 2A:
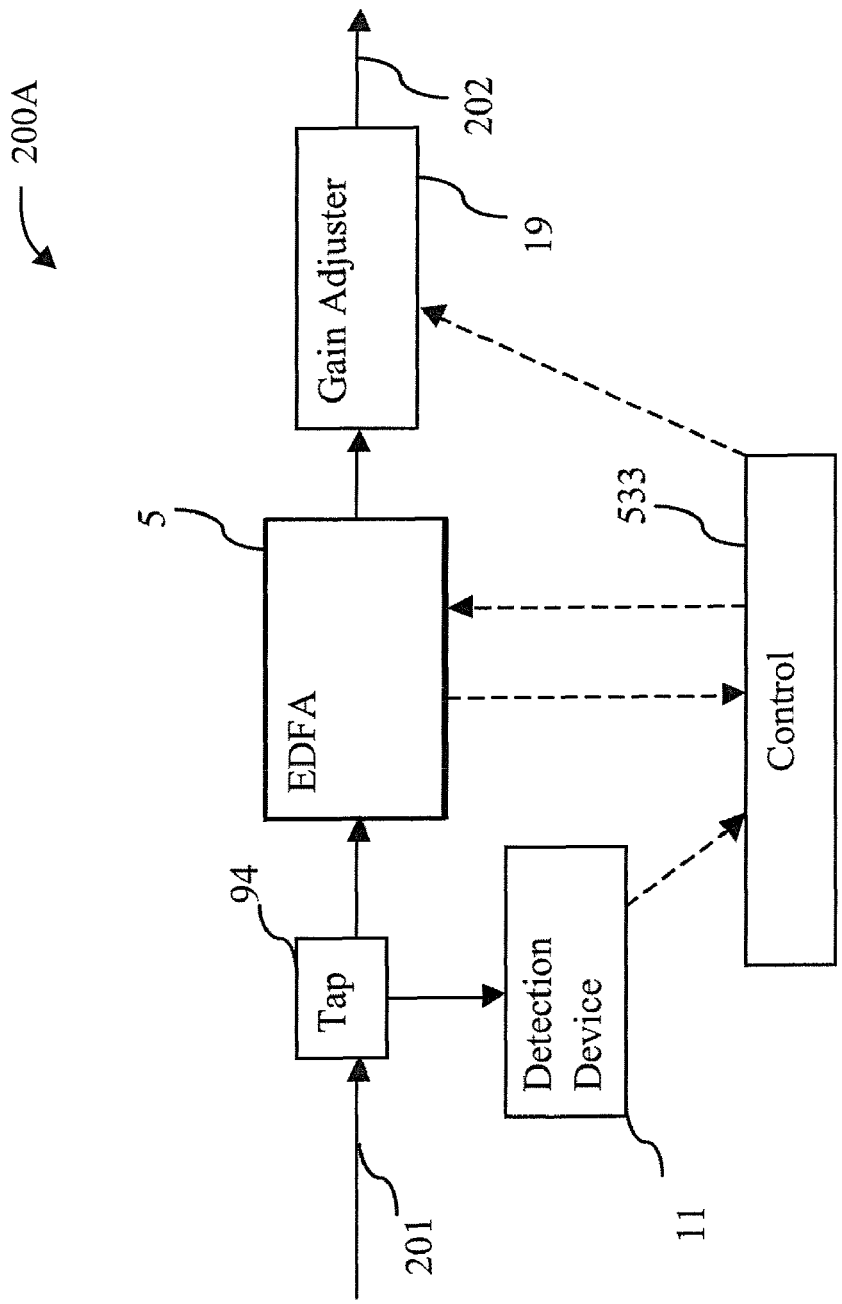
FIG. 2A-2C are general configurations of the apparatus of the present invention for flattening a gain profile of an optical amplifier.

FIG. 2A shows a preferred general configuration of the optical amplifier of the present invention with automatic control of the gain profile. The solid arrows represent optical signals and dashed arrows represent electrical or control signals. An optical amplifier 200A comprises a tap 94, an EDFA 5, a gain adjuster 19, a detection device 11, and a control unit 533. A small fraction of a multi-wavelength optical signal 201 is tapped off by tap 94, while most of the signal proceeds to EDFA 5, which amplifies the optical signal, and further to gain adjuster 19 which adjusts the gain profile of the amplifier 200A so as to minimize differences between optical powers of signals at various wavelength comprising an output signal 202. The specific realization of gain adjuster 19 will be considered in more detail below. Detection device 11, which will also be described in more detail below, produces a set of electrical signals to the control unit 533 which controls EDFA 5 and gain adjuster 19, so as to keep said differences between optical powers of signals at different wavelengths to a minimum.

All possible locations of gain adjuster 19, tap 94, and EDFA 5 will work with respect to the present invention, but some configurations are easier to implement than others. For example, in FIG. 2B, another preferred configuration of the amplifier of the present invention is shown. In an amplifier 200B, gain adjuster 19 is located before EDFA 5, and tap 94 with detection device 11 is located after EDFA 5. Further, in FIG. 2C, an amplifier 200C is shown wherein gain adjuster 19 is inserted at a mid-stage of EDFA 5, and a part of the gain adjustment function is carried by an EDFA itself. The role of gain adjuster device 19 can be performed by a dynamic gain equalizer or by a Raman amplifier.

Figure 2B:
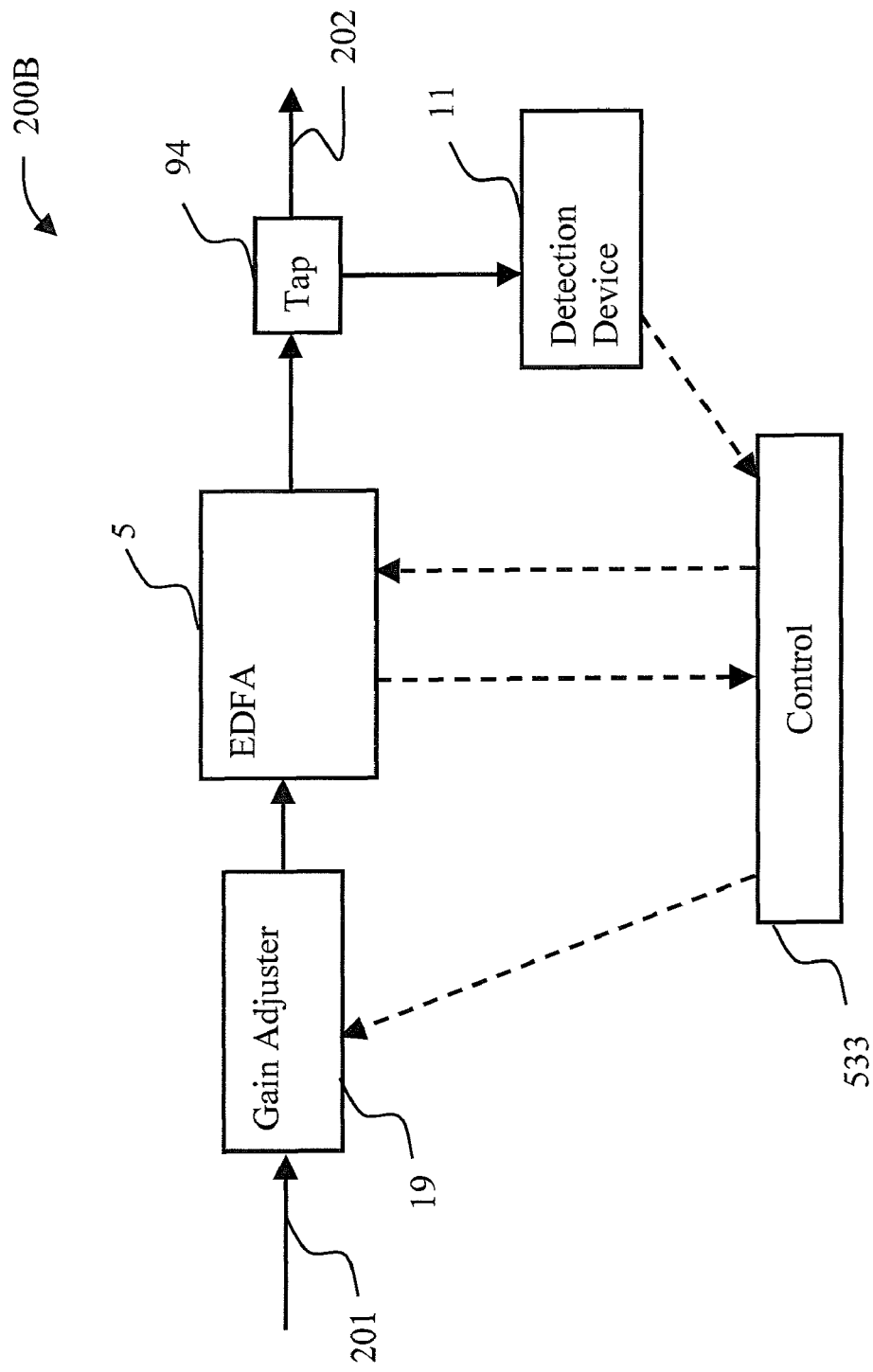
Figure 2C:
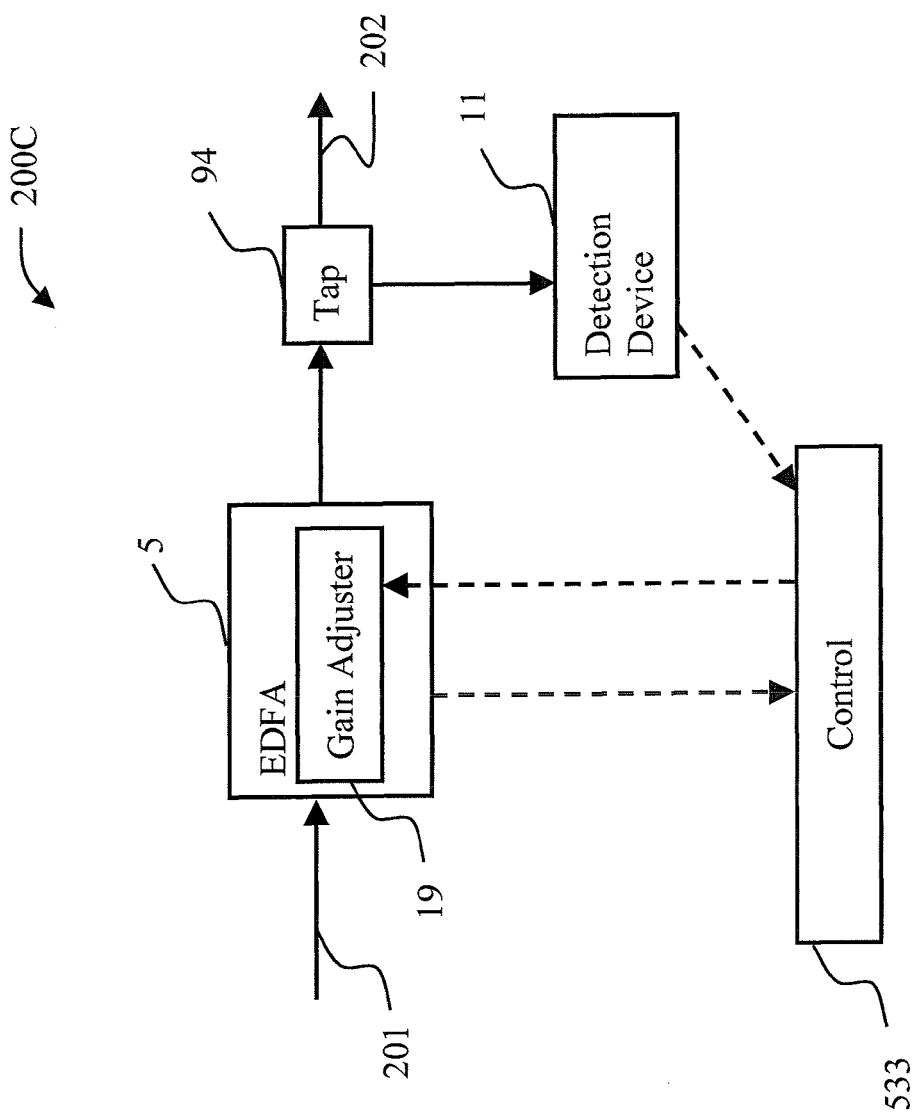
Figure 3:
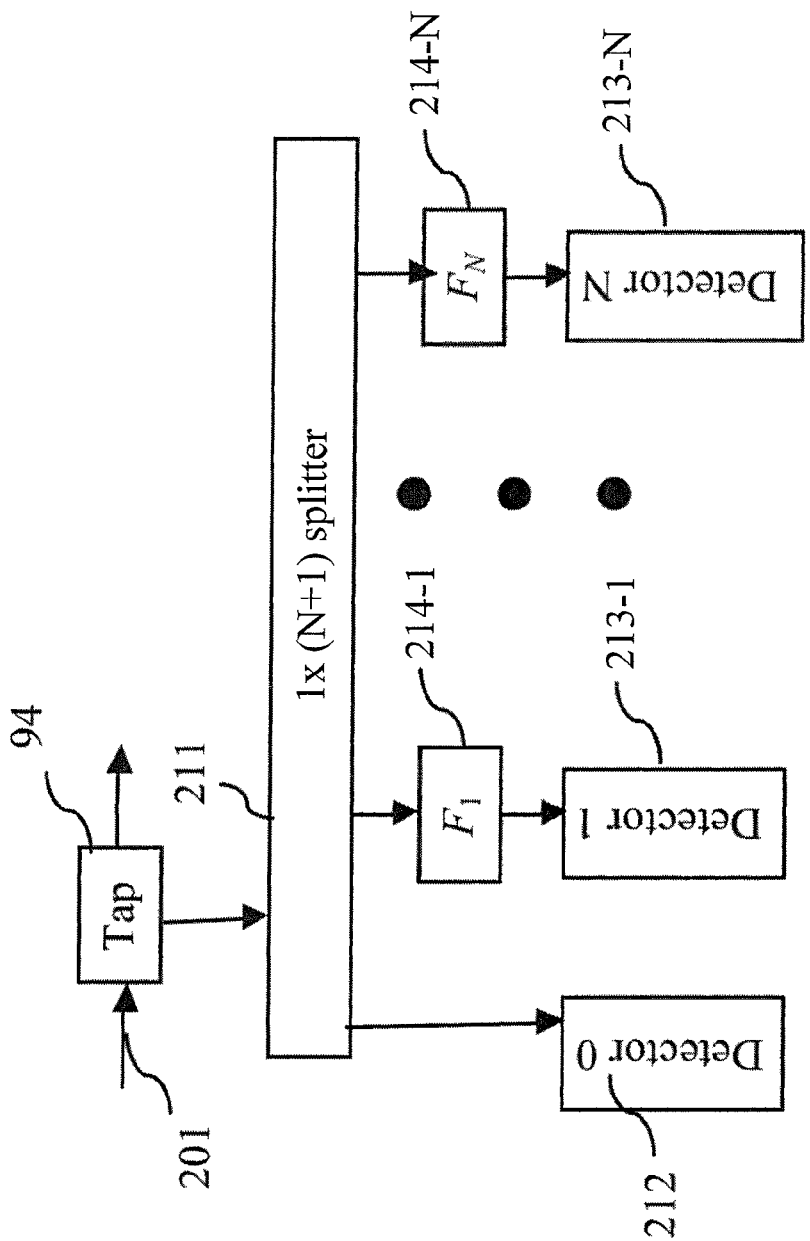
FIG. 3 is an optical circuit of a preferred embodiment of the detection device of the present invention.

Turning now to FIG. 3, a detection device of the present invention is shown comprising a 1×(N+1) splitter 211, a photodetector 212, a set of optical filters 214-1 . . . 214-N, and a set of photodetectors 213-1 . . . 213-N. The first photodetector 212 measures optical power proportional to the total power of the signal 201 coming through the tap 94. The remainder of the photodetectors 213-1 . . . 213-N measure the optical power of the signal coming through splitter 211 and optical filters 214-1 . . . 214-N, respectively. The transmission shapes $F_1(\lambda) \ldots F_N(\lambda)$ of these filters are selected in such a way that together with the gain adjuster 19 of FIGS. 2A-2C they give optimum compensation of the EDFA spectral hole burning (SHB).

Once the powers $P_1 \ldots P_N$ at photodetectors 213-1 . . . 213-N are measured, the controller generates a vector of numbers $x=x_1 \ldots x_M$, where M is the amount of independently adjustable parameters of gain adjuster 19 in FIGS. 2A-2C. These parameters may correspond to individual pump powers and, or variable optical attenuator (VOA) settings. The vector x is passed to gain adjuster 19 and to EDFA 5 of FIGS. 2A-2C. It is assumed that the overall gain change due to this adjustment, that is, the gain change between input 201 and output 202 of FIGS. 2A-2C, is the following:

$$\Delta G(\lambda) = \sum_{m=1 \ldots M} A_m(\lambda) \cdot x_m, \qquad (1)$$

where each $A_m(\lambda)$ is the gain modification by a single "actuator", that is, by the element of the gain adjuster 19 that is controlled by one of the component of the vector x. In other words, $A_m(\lambda)$ is a fraction of the gain modification caused by a $m^{th}$ actuator upon receiving a unitary control signal by said actuator. In equation (1), the gain modifications are expressed in dB units.

In the preferred embodiment the controller calculates vector x using the following equation:

$$x_m = C_{m,0} + \sum_{n=1 \ldots N} C_{m,n} \frac{P_n}{P_0} \qquad (2)$$

Here, $C_{m,n}$ are some constant coefficients obtained during system design, $P_n$ is the power measured at n-th detector in linear units such as in milliwatt, and $P_0$ is the power measured at detector 212 of FIG. 3, that is the total, or unfiltered, power. The total number of detectors is N+1.

Even though equation (2) gives very good results for SHB compensation, other formulas can be used for $x_i$ calculation. The most generic formula is $x_m=f_m(C_k, P_0 \ldots P_N)$, wherein $f_m$ is a pre-determined function and $C_k$ are some pre-determined constants.

During system design one needs to optimize the coefficients $C_{m,n}$ together with filter shapes $F_1(\lambda) \ldots F_N(\lambda)$ in such a way that the overall gain change is minimal for different loading conditions. This can be done via simulation when optimization procedure runs through randomly generated signal loading conditions while adjusting coefficients $C_{m,n}$ and filter shapes $F_1(\lambda) \ldots F_N(\lambda)$. Upon each adjustment, the optimization procedure calculates resulting gain change and, out of all filter shapes and coefficients $C_{m,n}$ tried, it chooses the ones corresponding to the minimal perturbation of the original gain profile. The calculated coefficients $C_{m,n}$ are then stored in the memory of control unit 533 to generate vector x.

Since coefficients $C_{m,n}$ are pre-calculated, the response time of the control unit 533 can be in sub-microsecond domain which is fast enough to compensate for most transients caused by changes of loading conditions of amplifiers 200A-200C of FIGS. 2A-2C.

The apparatus of present invention will work using different numbers of detectors and actuators. While increasing the number of detectors and actuators generally improves the degree of achieved gain profile flatness of amplifiers 200A-200C of FIGS. 2A-2C, an optimal number of detectors and actuators exists which is capable of adequately compensating for both SHB and stimulated Raman scattering tilt. A simulation has shown that, surprisingly, only one filter, two detectors, and three or four actuators are sufficient to compensate for these effects.

In case of optimization involving more than one filter, the transmission functions of the filters may have common regions of non-zero transmission. Thus, the different filters are not just different bandpass filters used to obtain optical powers in different areas of the spectrum of multi-wavelength optical signal to be amplified, as it is in the case of, for example, an apparatus of U.S. Pat. No. 7,359,112. Advantageously, the spectral shapes $F_1(\lambda) \ldots F_N(\lambda)$ of the filters of the present invention are optimized using the abovementioned optimization procedure, so as to ensure that the filters 214-1 . . . 214-N filter out signals which are most representative of transient perturbations of the amplifier gain profile caused by spectral variations in optical signal 201 of FIG. 3.

Further, tap 94 and 1×(N+1) splitter 211 of the detection device of FIG. 3 can be replaced by any combination of taps and splitters tapping a portion of signal 201 in the form of N+1 sub-portions, one sub-portion being coupled to detector 212 and remaining N sub-portions each being coupled to one of filters 214-1 . . . 214-N coupled to detectors 213-1 . . . 213-N, respectively. Any such modification would result in an operational apparatus and, therefore, is a part of the present invention.

Figure 4:
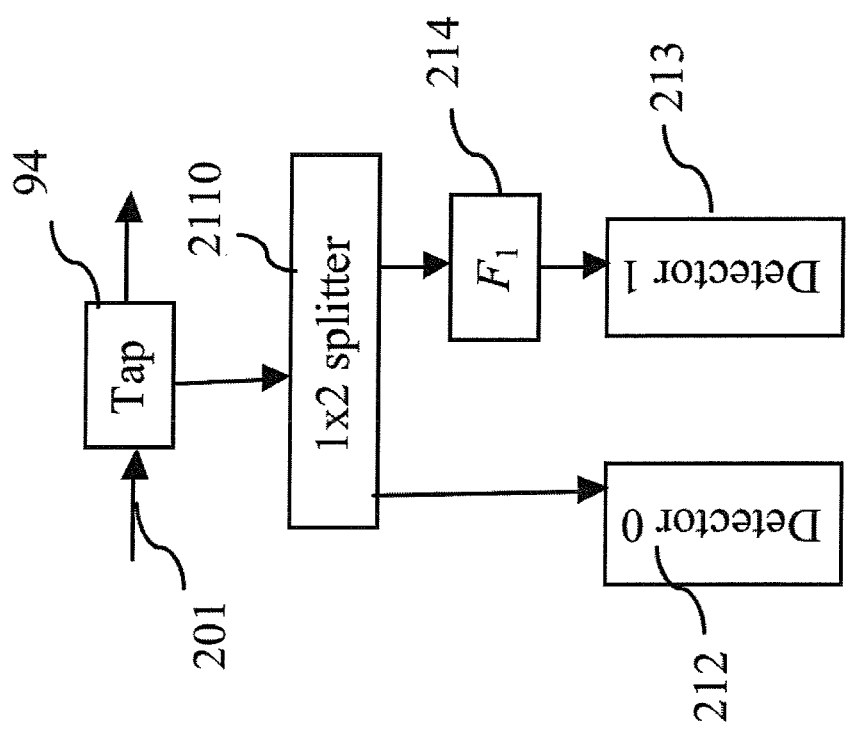
FIG. 4 is an optical circuit of a preferred embodiment of the detection device for the case of only a single filter and two detectors.

Turning now to FIG. 4, an optical circuit of a detection device is shown having a 1×2 splitter 2110, a filter 214, and two detectors 212 and 213. Similarly, tap 94 and 1×2 splitter 2110 of FIG. 4 can be replaced, for example, by two taps, not shown, the first tap, not shown, being coupled to detector 212, and the second tap, not shown, being coupled to filter 214 coupled to detector 213. Upon such modification, or any other similar modification, the apparatus will still perform its intended function and, therefore, any such modification is a part of the present invention.

Figure 5:
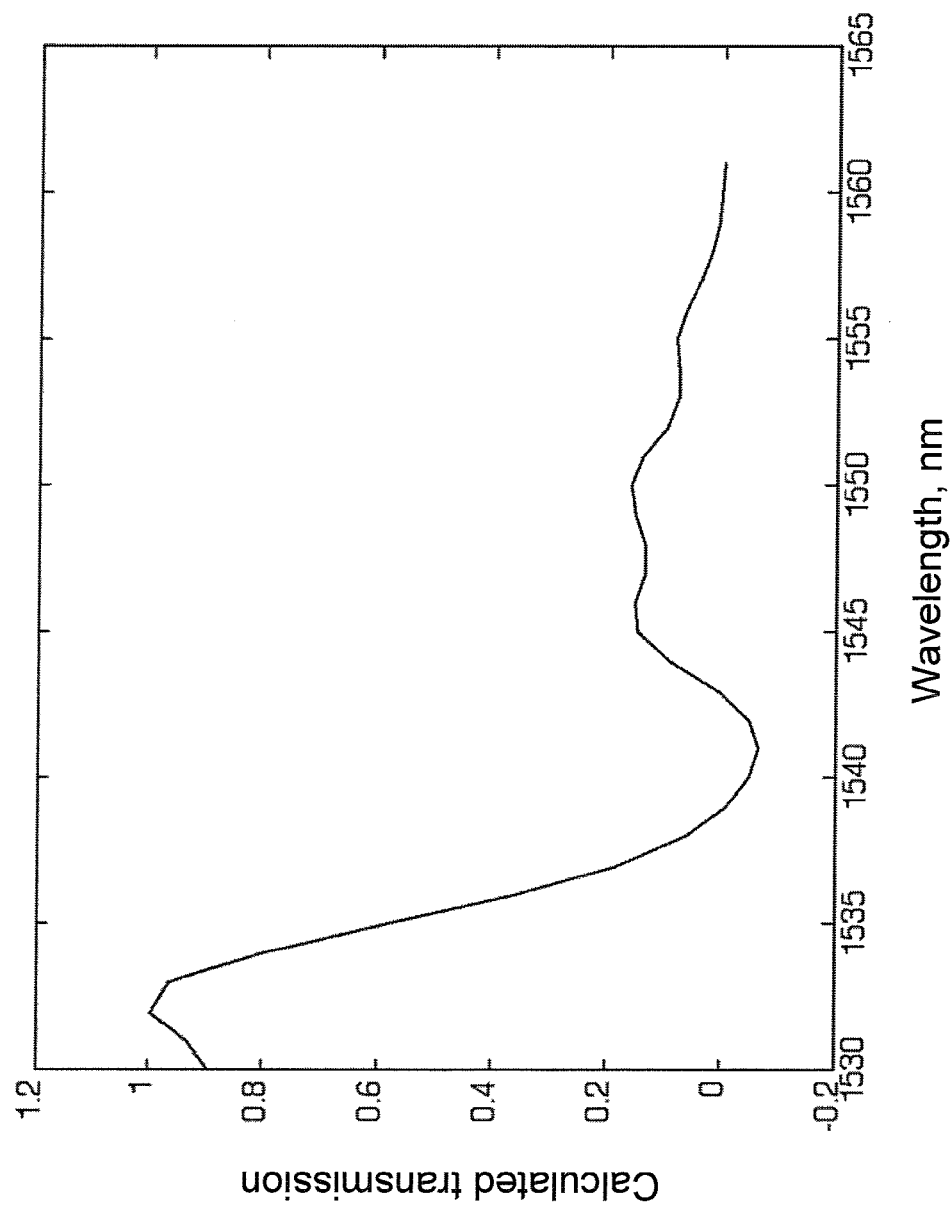
FIG. 5 is a calculated transmission filter function for the filter in the detection device of FIG. 4.

The filter transmission function $F_1(\lambda)$ of filter 214 of FIG. 4, obtained through the abovementioned optimization procedure, is shown in FIG. 5. The filter transmission function of FIG. 5 has a transmission peak reaching a maximum transmission at a wavelength of 1532+−2 nm, an attenuation peak reaching a minimum transmission at a wavelength of 1541+−2 nm, and an intermediate transmission of between 10% and 30% of the maximum transmission minus minimum transmission within a 1550+−5 nm wavelength band. An apparent drop below zero in FIG. 5 at 1541+−1 nm is a result of optimization, and, in a real filter, the transmission in this region can be taken equal to zero or, alternatively, the whole curve can be shrunk to fit between 0% and 100% transmission. Both methods were found to give adequate results.

Figure 6:
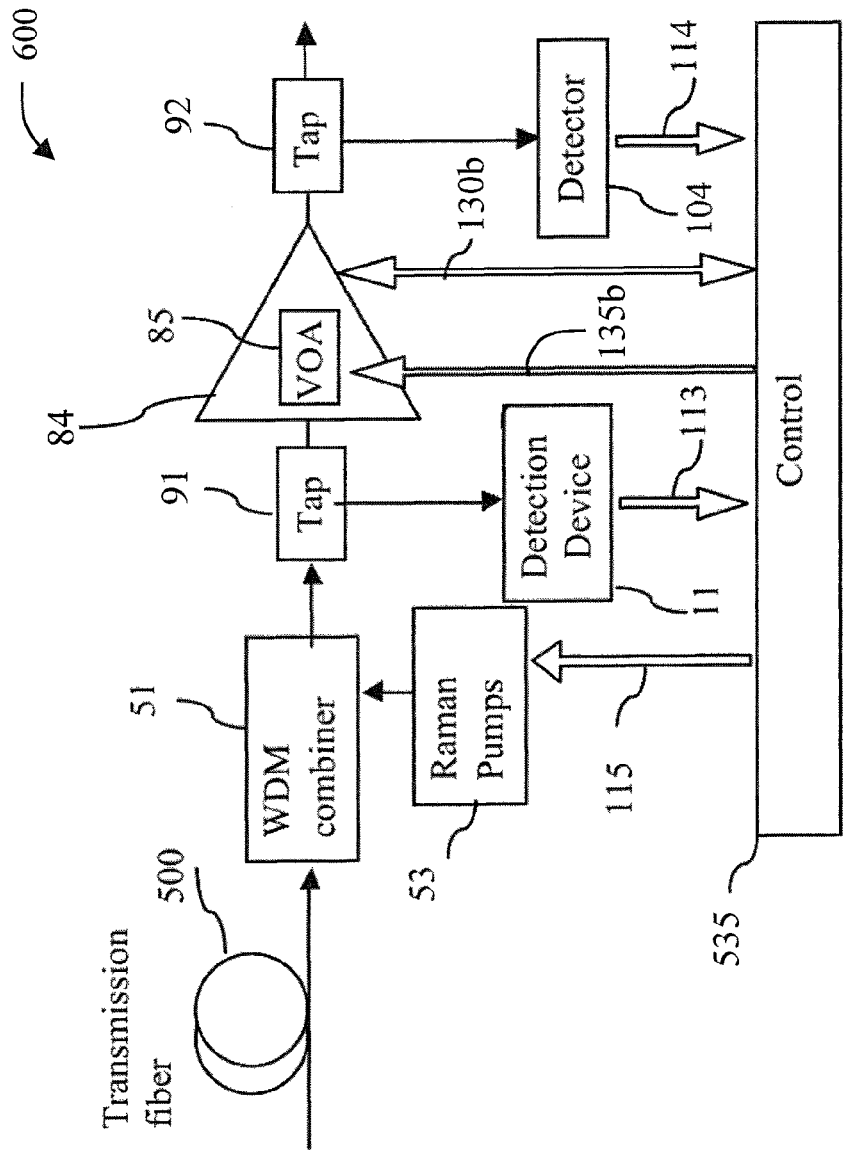
FIG. 6 is a configuration of the apparatus of the present invention showing a particular implementation of the actuators.

Turning now to FIG. 6, another preferred embodiment of an amplifier 600 of the present invention is shown comprising an EDFA 84 working together with a distributed Raman amplifier comprising Raman pumps 53, a WDM combiner 51 and a transmission fiber 500. The actuators are the Raman pumps 53 and erbium doped fiber average inversion of EDFA 84. The average inversion adjustment is performed by varying EDFA pump powers as is symbolically shown with an arrow 130b. When EDFA pumps are adjusted, the average EDFA gain is measured via a detector 104 and detectors in a detection device 11 having two detectors and one filter, not shown. Detection device 11 receives an optical signal from a tap 91 located before EDFA 84, and passes corresponding electrical signals to a control unit 535 through a line 113, and detector 104 receives a fraction of an output optical signal tapped by an output tap 92 and passes corresponding electrical signal to control unit 535 through a line 114. The measured gain is then held constant by control unit 535 via adjustment of a VOA 85 through a line 135b using (configuration-specific) values of $C_{m,n}$ or $C_k$ stored in its memory. Generally, VOA 85 can be positioned anywhere in amplifier 600, including before or after erbium doped fiber coils, not shown. Also, there can be more than one VOA, in this case any of the VOA or all of them can be adjusted. The pump powers of Raman pumps 53 are adjusted by control unit 535 through a line 115.

Figure 7:
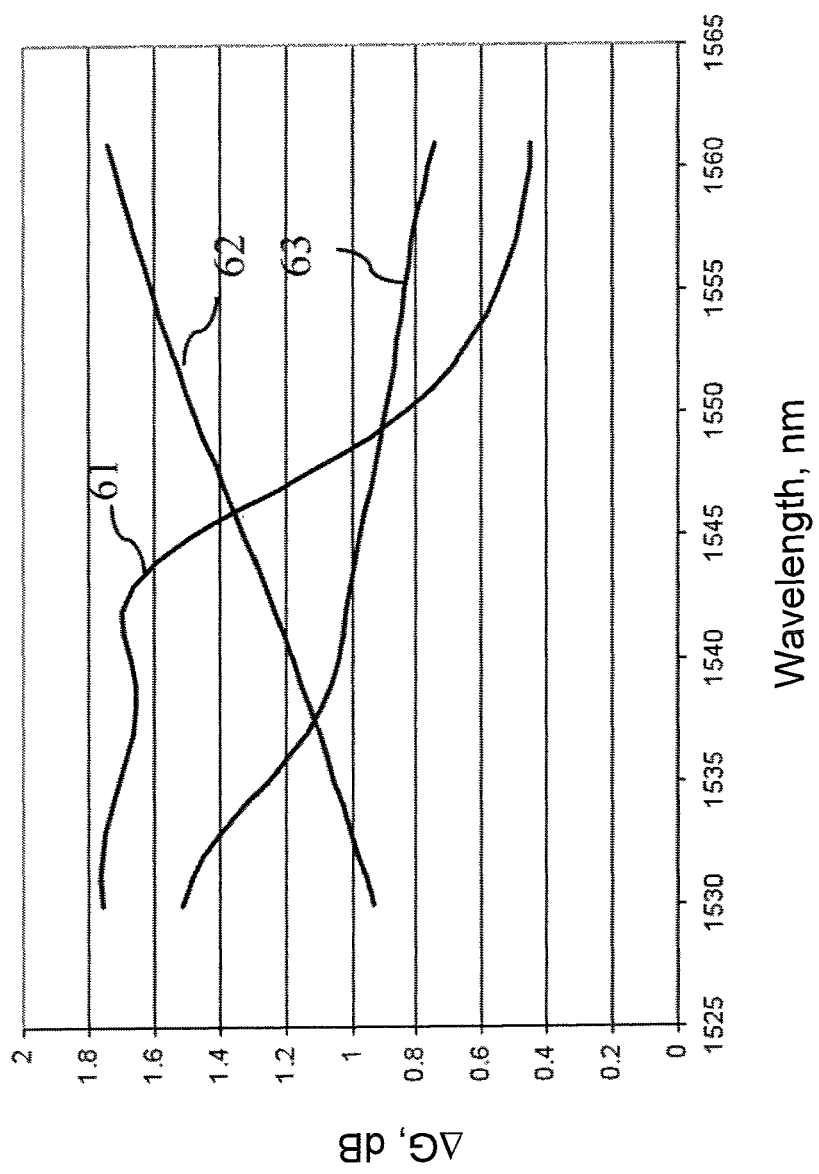
FIG. 7 is a graph showing changes in overall amplifier gain due to Raman amplifier and erbium doped fiber amplifier pump changes.

An example of the actuator functions $A_m(\lambda)$ is shown in FIG. 7. Functions 61 and 62 are the gain changes due to Raman pump change (two Raman pumps in this example) and a function 63 is the change due to average inversion adjustments, before gain of EDFA 84 of FIG. 6 is adjusted by VOA 85 of same Figure. Using the average inversion actuator reduces the need of having more than two Raman pump actuators for good SHB compensation.

It should be noted that even though a distributed counter-propagation Raman amplifier topology is described in the preferred embodiment of FIG. 6, the present invention is not limited to this particular topology; other topologies can be used, such as co-pumping or discrete Raman amplifier located anywhere near or within EDFA.

Simulations over 520 randomly generated cases have shown that actuator functions shown in FIG. 7 together with the filter function shown in FIG. 5 and with optimized coefficients $C_{m,n}$ of equation (2) can reduce the gain change due to SHB by a factor of 2 on average. For further reduction of the SHB induced changes one needs to increase the number of filters and detectors in detection device 11. The increase of the number of Raman pumps also helps with the SHB compensation but the improvements are minor in case of a single filter 214, however the improvements will be more significant together with larger number of filters.

What is claimed is:

1. An apparatus for flattening a gain profile $G(\lambda)$ of a hybrid amplifier comprising an erbium doped fiber amplifier (EDFA) and a Raman amplifier (RA) for amplifying a stream of optical signals, the apparatus comprising:

a detection device arranged to receive a tapped portion of the stream of optical signals in the form of N+1 sub-portions and to provide N+1 output signals $P_0 \ldots P_N$ in dependence upon said N+1 sub-portions, wherein N is an integer positive number, the detection device comprising: N spectral filters having respective transmission functions $F_1(\lambda) \ldots F_N(\lambda)$; and N+1 photodetectors for producing the N+1 output signals $P_0 \ldots P_N$, in response to a light impinging thereon, wherein the first sub-portion of the tapped portion of the stream of optical signals is coupled to the first photodetector for producing the signal $P_0$, and each one of remaining N of said sub-portions of the tapped portion of the stream of optical signals is coupled to one of the N spectral filters coupled to one of the remaining N photodetectors for producing the signals $P_1 \ldots P_N$;

a controller arranged to receive said signals $P_0 \ldots P_N$ from the detection device and suitably programmed to provide M control signals $x_1 \ldots x_M$ in dependence upon said signals $P_0 \ldots P_N$, wherein M is an integer positive number and $x_m = f_m(C_k, P_0 \ldots P_N)$, wherein $f_m$ is a predetermined function and $C_k$ are pre-determined constants, for each $m=1 \ldots M$; and M spectral actuators $S_1 \ldots S_M$ arranged to receive said control signals $x_1 \ldots x_M$, respectively, and modify the gain profile $G(\lambda)$ by a value $\Delta G(\lambda)$ according to the equation $$\Delta G(\lambda) = \sum_{m=1 \ldots M} A_m(\lambda) \cdot x_m,$$

wherein $A_m(\lambda)$ is a fraction of said modification caused by the $m^{th}$ actuator $S_m$ upon receiving a unitary control signal by said actuator;

wherein the functions $f_1 \ldots f_M$ and $F_1 \ldots F_N$ are selected so as to increase flatness of the gain profile G, wherein the set of functions $f_m$ is defined as $$f_m = C_{m,0} + \sum_{n=1 \ldots N} C_{m,n} \frac{P_n}{P_0},$$

where $C_{m,n}$ are M·N pre-determined constants.

2. An apparatus of claim 1 wherein N>1 and wherein the transmission functions $F_1 \ldots F_N$ have at least one overlapping wavelength region having substantially non-zero transmission.

3. An apparatus of claim 1 wherein the detection device further comprises a 1×(N+1) splitter for splitting the tapped portion of the stream of optical signals into the N+1 sub-portions.

4. An apparatus of claim 1, wherein the M spectral actuators are selected from a group consisting of a pump of the EDFA, a pump of the RA, and a variable optical attenuator (VOA).

5. An apparatus of claim 1 further comprising a second separate RA, wherein the M spectral actuators are selected from a group consisting of a pump of the EDFA, a pump of the RA, a pump of the second separate RA, and a variable optical attenuator (VOA).

6. An apparatus of claim 1, wherein the tapped portion of the stream of optical signals is tapped at a location upstream of the hybrid amplifier.

7. An apparatus of claim 1, wherein the tapped portion of the stream of optical signals is tapped at a location downstream of the hybrid amplifier.

8. An apparatus of claim 1, wherein the tapped portion of the stream of optical signals is tapped at a location inside the hybrid amplifier.

9. An apparatus of claim 1 wherein N=1 and the transmission function $F_1(\lambda)$ has a transmission peak reaching a maximum transmission at a wavelength of 1532+−2 nm, an attenuation peak reaching a minimum transmission at a wavelength of 1541+−2 nm, and an intermediate transmission of between 10% and 30% of the maximum transmission minus minimum transmission, wherein said intermediate transmission is achieved within a 1550+−5 nm wavelength band.

10. An apparatus of claim 4 wherein the pump of the RA propagates towards the stream of optical signals.

11. An apparatus of claim 4 wherein M=3.

12. An apparatus of claim 4 wherein M=4.

13. An apparatus of claim 11 wherein the actuators comprise one Raman pump, one EDFA pump, and one VOA.

14. An apparatus of claim 12 wherein the actuators comprise two Raman pumps, one EDFA pump, and one VOA.

15. A method for flattening a gain profile $G(\lambda)$ of a hybrid amplifier comprising an erbium doped fiber amplifier (EDFA) and a Raman amplifier (RA) for amplifying a stream of optical signals, the method comprising:

splitting a tapped portion of the stream of optical signals in the form of N+1 sub-portions;

measuring optical power value $P_0$ of the first said sub-portion;

spectral filtering remaining N sub-portions through N filters having respective transmission functions $F_1(\lambda) \ldots F_N(\lambda)$, and measuring optical power values $P_1 \ldots P_N$ of the respective filtered sub-portions of the tapped portion;

generating M control signals $x_1 \ldots x_M$ based on the formula $x_m = f_m(C_k, P_0 \ldots P_N)$, wherein $f_m$ is a pre-determined function and $C_k$ are pre-determined constants, for each $m=1 \ldots M$;

applying said M control signals $x_1 \ldots x_M$ to M spectral actuators $S_1 \ldots S_M$, respectively, wherein said actuators modify the gain profile $G(\lambda)$ by a value $$\Delta G(\lambda) = \sum_{m=1 \ldots M} A_m(\lambda) \cdot x_m,$$

wherein $A_m(\lambda)$ is a fraction of said modification caused by the $m^{th}$ actuator $S_m$ upon receiving a unitary control signal by said actuator;

wherein the functions $f_1 \ldots f_M$ and $F_1 \ldots F_N$ are chosen so as to increase the flatness of the gain profile $G(\lambda)$, wherein the set of functions $f_m$ is defined as $$f_m = C_{m,0} + \sum_{n=1 \ldots N} C_{m,n} \frac{P_n}{P_0},$$

where $C_{m,n}$ are M·N pre-determined constants.

16. A method of claim 15 wherein N>1 and wherein the transmission functions $F_1 \ldots F_N$ have at least one overlapping wavelength region having substantially non-zero transmission.

17. A method of claim 15 wherein N=1, M=3.

18. A method of claim 15 wherein N=1, M=4.

* * * * *